(12) United States Patent
Hudson, Jr. et al.

(10) Patent No.: US 8,904,349 B2
(45) Date of Patent: Dec. 2, 2014

(54) SELECTIVELY APPLYING CHANGES TO A VERSION OF A COMPONENT

(75) Inventors: Thomas R. Hudson, Jr., Cary, NC (US); Pratik P. Shah, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/563,162

(22) Filed: Sep. 20, 2009

(65) Prior Publication Data

US 2011/0072416 A1 Mar. 24, 2011

(51) Int. Cl.
*G06F 9/44* (2006.01)
*G06F 17/30* (2006.01)

(52) U.S. Cl.
CPC .. *G06F 8/38* (2013.01); *G06F 8/36* (2013.01); *Y10S 707/955* (2013.01)
USPC ............................ 717/116; 717/108; 707/955

(58) Field of Classification Search
None
See application file for complete search history.

(56) References Cited

U.S. PATENT DOCUMENTS

| 5,313,630 | A | * | 5/1994 | Namioka et al. ........ 707/999.103 |
| 5,592,661 | A | * | 1/1997 | Eisenberg et al. ..................... 1/1 |
| 5,680,619 | A | * | 10/1997 | Gudmundson et al. ........ 717/108 |
| 5,822,587 | A | * | 10/1998 | McDonald et al. ........... 717/108 |
| 5,907,704 | A | * | 5/1999 | Gudmundson et al. ........ 717/123 |
| 5,978,582 | A | * | 11/1999 | McDonald et al. ........... 717/108 |
| 6,377,954 | B1 | * | 4/2002 | Togawa ........................ 717/100 |
| 6,480,856 | B1 | * | 11/2002 | McDonald et al. ........... 717/108 |
| 7,322,030 | B1 | * | 1/2008 | Boodro et al. ................ 717/170 |
| 7,689,602 | B1 | * | 3/2010 | Sim-Tang ..................... 707/673 |
| 7,890,478 | B2 | * | 2/2011 | Fiedler ......................... 707/694 |
| 2007/0250481 | A1 | * | 10/2007 | Fiedler ............................. 707/3 |

\* cited by examiner

*Primary Examiner* — Don Wong
*Assistant Examiner* — Erika Kretzmer
(74) *Attorney, Agent, or Firm* — Marcia L. Doubet

(57) ABSTRACT

Controlling how changes made to a version of a reusable component (e.g., for displaying in a graphical user interface) are applied, or not applied, to another version or versions of that component. A variation is defined, the variation comprising a set of overridden property values for the component. The variation is derived from a version of the component, and inherits property values from the version and also from its ancestors, if applicable. To reuse the component, the reuse may be derived from the variation, in which case the reuse inherits the overridden property values through the variation, provided the variation is turned on, and through the version from which the variation was derived if the variation is turned off. A particular variation may be turned on and off within an inheritance chain.

14 Claims, 18 Drawing Sheets

```
1301   1302
<diagram uuid="dhw3jd3j" ... >
1305   <contents>
1306      <dialog>
           <text>New Java Class</text>
1310      <contents>
1320         <panel ... >
                ...
1331            <image key="52140" src="error.gif" visible="false" ... />
1332            <label key="49302" name="Error Message" visible="false" ... >
                   <text>Replace this with your Error Message</text>
                </label>
             </panel>
             ...
1360         <button name="Next Button" key="23210">
                <text>Next > </text>
             </button>
1370         <button name="Finish Button" key="90210">
                <text>Finish</text>
             </button>
             ...
          </contents>
       </dialog>
1380   </contents>
       <variation name="Showing Error State" id="V001" ... >
1381      <image key="52140" visible="true" ... />
1382      <label key="49302" visible="true"/>
1383      <button key="23210" enabled="false"/>
1384      <button key="90210" enabled="false"/>
       </variation>
</diagram>
```

FIG. 14
*1400*

```
1401      1402    1403
<diagram master="dhw3jd3j" uuid="xyz27dh1" ... >
1405   <overrides>
       ...
1451   <label key="78772">
           <text>My Class</text>
       </label>
1452   <label key="49302">
           <text>Class name cannot contain a space character</text>
       </label>
1490   <variation id="V001" enabled="true"/>
       ...
       </overrides>
</diagram>
```

```
1501
    1502
<diagram master="xyz27dh1" ... >
1505    <overrides>
        ...
1551    <label key="78772">
            <text>MyClass</text>
        </label>
1590    <variation id="V001" enabled="false"/>
        ...
    </overrides>
</diagram>
```

SELECTIVELY APPLYING CHANGES TO A VERSION OF A COMPONENT

BACKGROUND OF THE INVENTION

The present invention relates to computing environments, and deals more particularly with controlling how changes made to a version of a reusable component or part (e.g., for displaying in a graphical user interface) are applied, or not applied, to another version or versions of that component or part.

The term "storyboard" is used in the software development community to refer to a sequence of views that may be displayed on a graphical user interface ("GUI"). The individual views may be referred to as "frames", "wireframes", or "sketches". A storyboard may be used for purposes such as illustrating how a user will interact with a software application. The storyboard may comprise an initial frame from which the user would begin his or her interaction, and may include subsequent frames to illustrate what the user would see displayed on the GUI in response to various user selections.

Designing a visual interface by prototyping a sequence of interrelated views with a storyboard may lead to better communication of user interface ("UI") requirements and/or may help find issues before effort is put into developing the user interface.

BRIEF SUMMARY OF THE INVENTION

The present invention is directed to selectively applying changes to a version of a component that comprises a plurality of properties. In one embodiment, this comprises: defining a variation as derived from and inheriting through a component, the variation comprising, for each of at least one of the plurality of properties of the component, an override to a value thereof; upon a reuse of the component that creates a new version thereof, defining the new version as derived from the variation, wherein the new version comprises, for each of at least one of the plurality of properties of the component, an override to the value thereof; and determining values of the plurality of properties of the new version as inheriting through the variation when the variation is turned on and as inheriting directly through the component when the variation is turned off. A unique key value is preferably associated with each of the at least one of the plurality of properties of the component for which an override to the value thereof is defined, the unique key value being usable for locating the overridden property.

In one aspect, determining the values of the plurality of properties further comprises: obtaining, from the new version, each of the at least one of the plurality of properties for which the new version comprises an override to the value thereof; and for all of the plurality of properties for which the new version does not comprise an override to the value thereof, recursively searching ancestor components in an inheritance chain through which the new version inherits until locating a value for the property, wherein the variation occurs in the inheritance chain as an ancestor of the new version if the variation is turned on and does not occur in the inheritance chain as an ancestor of the new version if the variation is turned off. A unique key value preferably identifies the variation and this unique key value is associated with the new version to enable finding the variation as the ancestor of the new version in the inheritance chain.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 13-15 provide sample Extensible Markup Language ("XML") documents to illustrate one approach to use of unique keys for variations;

DETAILED DESCRIPTION OF THE INVENTION

Figure 1:
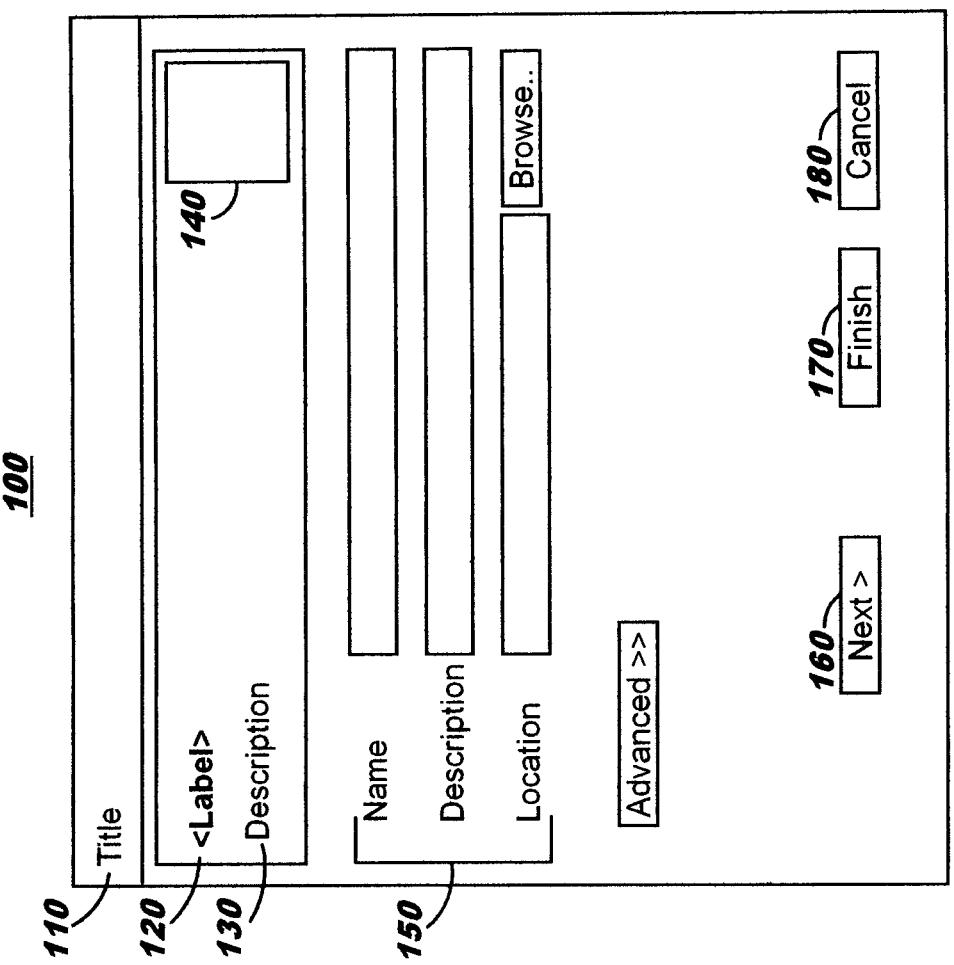
FIG. 1 illustrates a sample generic wizard dialog.

Embodiments of the present invention are directed toward controlling how changes made to a reusable component (referred to equivalently herein as a "reusable part") are applied, or not applied, to another version or versions of that component or part. This is also referred to herein as "selectively applying" the changes. The changes may pertain, for example, to visual properties for displaying the part in a graphical user interface Reusable components enable graphic designers to construct complex wireframes more quickly. If a designer is building a GUI for a website, for example, a component may include elements such as images, labels, text fields for a form, buttons, and so forth (also referred to hereinafter as "widgets"). A "mini shopping cart" that may provide a visual display of a shopping cart icon as well as an area in which an item count and currency value are shown as a running total is an example of a reusable component that could be used on many pages of a website.

A component may be a group or collection of widgets and/or other components, and may be considered as a small piece of the UI that recurs in the UI and can be used to construct wireframes. In some cases, components are immutable, unless the group is deconstructed or ungrouped for use in a wireframe. When a component is reused, its properties are inherited. For the new instance created by the reuse, different values may be set for one of more of those properties, which results in overriding the inherited value of those properties and thus creating a new version of the component. In a simple example, a graphical button might be reused, and a property representing the background color might be overridden for the new instance; or, a property representing the text to be displayed on the button might be overridden. Note that not all of the properties need to be overridden; in some cases, selected properties may be aggregated or merged, such as a "children" property. For example, suppose a widget represents a container that can host other widgets inside it. If a new widget is added to that container in a reuse, the reuse should merge that new widget along with all of the children that were defined as children of that container in the original part. The term "override" is used herein in a general sense to refer to changing a property in a reuse or merging properties in a reuse.

In a more complex example, suppose that a wizard-style dialog is being built as a series of frames using a storyboard approach. A generic wizard dialog may be developed for use in the storyboard, where this generic wizard dialog is provided as a reusable part. This generic wizard dialog can then be customized to create more specific wizard dialogs by changing an icon, overriding the value of text labels, and so forth. Further suppose that in certain scenarios, it is desirable to put a wizard dialog into an error state, such as when a user enters an invalid character in a file name or forgets to enter required data into a field of the dialog. A wizard frame for the error state is then desired for indicating the error state to the user. This may comprise displaying a red "X" in the frame, displaying error message text, disabling a "Finish" button, and so forth. Other types of customizations might be made as well, for purposes other than representing an error state, such as changing the background color for one or more frames of the storyboard; changing the font of a field description to bold; changing the status of a checkbox between checked and unchecked; and so forth.

The inheritance that occurs when reusing parts may be modeled as a tree, or hierarchy, where a child node in this hierarchy represents reuse of a parent node which is overridden by the child. The child node is sometimes referred to as being "derived" from the parent. The hierarchy may be considered as an inheritance chain among the nodes, where a child node in turn becomes a parent node from which a new child is derived, with each new child providing overrides of its parent while inheriting non-overridden properties of the parent—where these non-overridden properties of the parent may represent overrides made by the parent or an ancestor of the parent. While this reusable parts approach decreases the time required to develop a large number of frames, it may become difficult to maintain proper synchronization among the various versions. Techniques disclosed herein enable selectively applying changes, and avoid these synchronization issues, as will now be demonstrated, referring to a wizard dialog scenario to illustrate use of the present invention. Techniques disclosed herein are not limited to use with wizard dialogs, however, and this example scenario is therefore provided by way of illustration an not of limitation.

FIG. 1 illustrates a sample generic wizard dialog 100. As can be seen by inspection, the generic wizard dialog includes a placeholder 110 for a title of an actual dialog; a placeholder 120 for a label; a placeholder 130 for a description; a default icon 140; a set 150 of empty text entry fields with associated descriptive text; a "Next" button 160; a "Finish" button 170; and a "Cancel" button 180.

The generic wizard dialog 100 of FIG. 1 may be reused to provide various more specific, or customized, wizards. The example scenario provided herein comprises a first reuse to provide a Java® class wizard, and a second reuse to provide an enumerated type wizard. ("Java" is a registered trademark of Oracle America, Inc. in the United States, other countries, or both.) The reuse to provide a Java class wizard is illustrated by sample wizard 200 in FIG. 2, as will now be discussed, and the reuse to provide an enumerated type wizard is discussed in more detail below with reference to FIG. 3. As shown in the sample Java class wizard 200 of FIG. 2, actual values pertinent to a Java programming environment are provided to replace, or override, the placeholders 110, 120, 130 from the generic wizard dialog 100. See reference numbers 210, 220, and 230 of FIG. 2. The default icon 140 has also been overridden by a different icon 240 for displaying on the Java class wizard 200.

Figure 2:
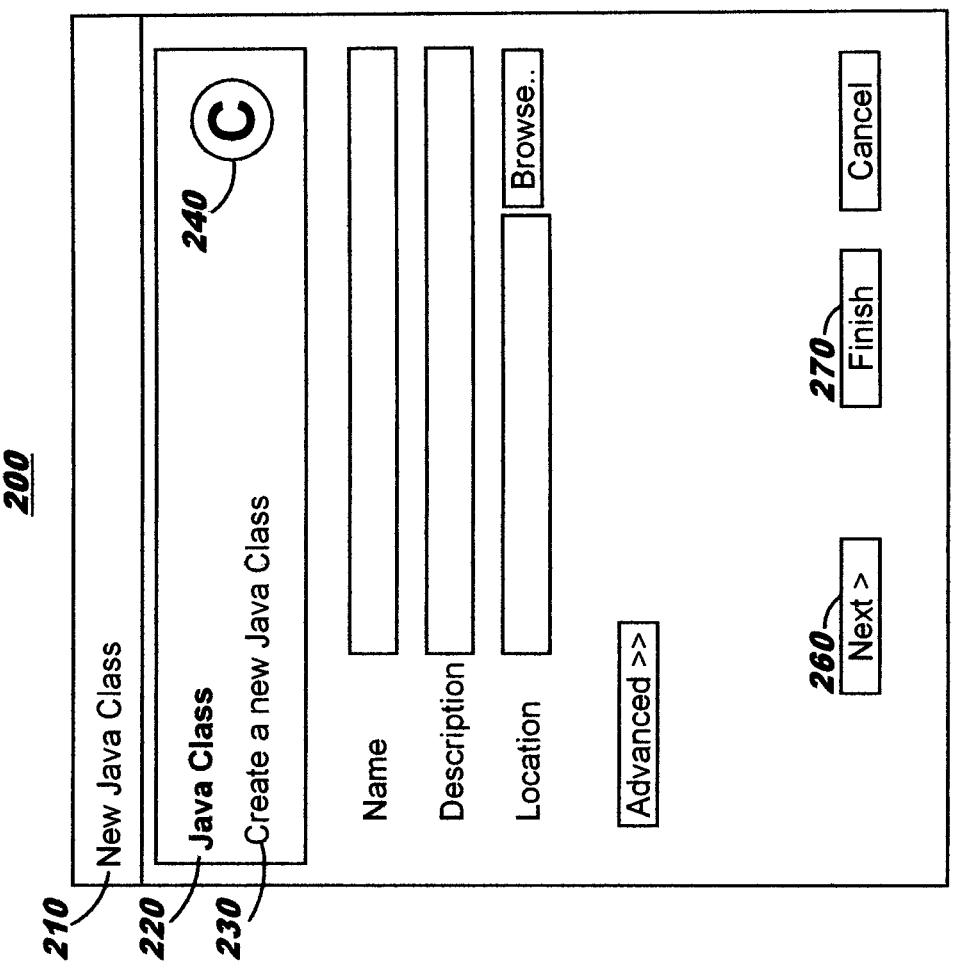
FIGS. 2-3 illustrate a sample Java class wizard and a sample enumerated type wizard, respectively, which are derived from the sample generic wizard dialog of FIG. 1.
Figure 3:
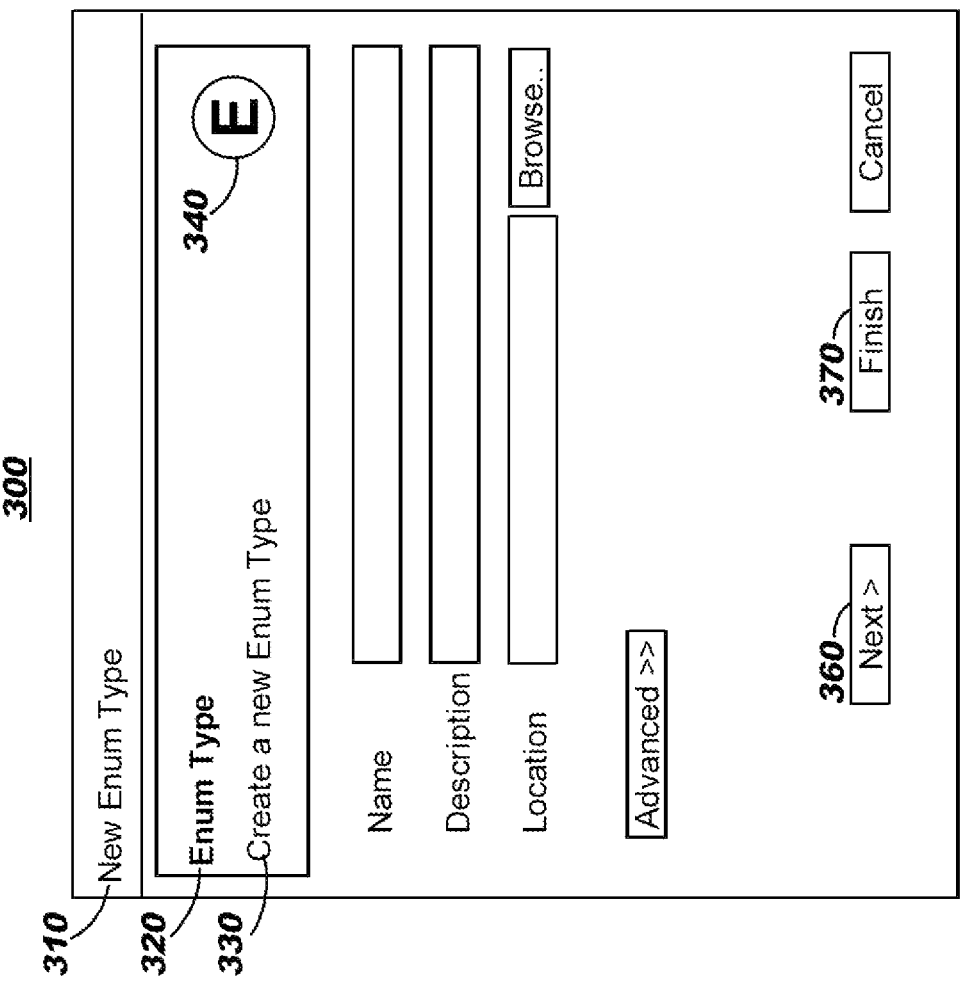

Reuse of the generic wizard dialog 100 to provide an enumerated type wizard is illustrated by the sample wizard 300 of FIG. 3. FIG. 3 depicts overriding the placeholders 110, 120, 130 from the generic wizard dialog 100 with actual values 310, 320, 330, and overriding the default icon 140 with a different icon 340. As can be seen, the overrides of FIG. 3 are different from those of FIG. 2. The examples in FIGS. 1-3 therefore illustrate how a single base version 100 can be used to create two different customized versions 200, 300 by inheriting a number of commonly-needed components and overriding properties where customizations are desired.

Figure 4:
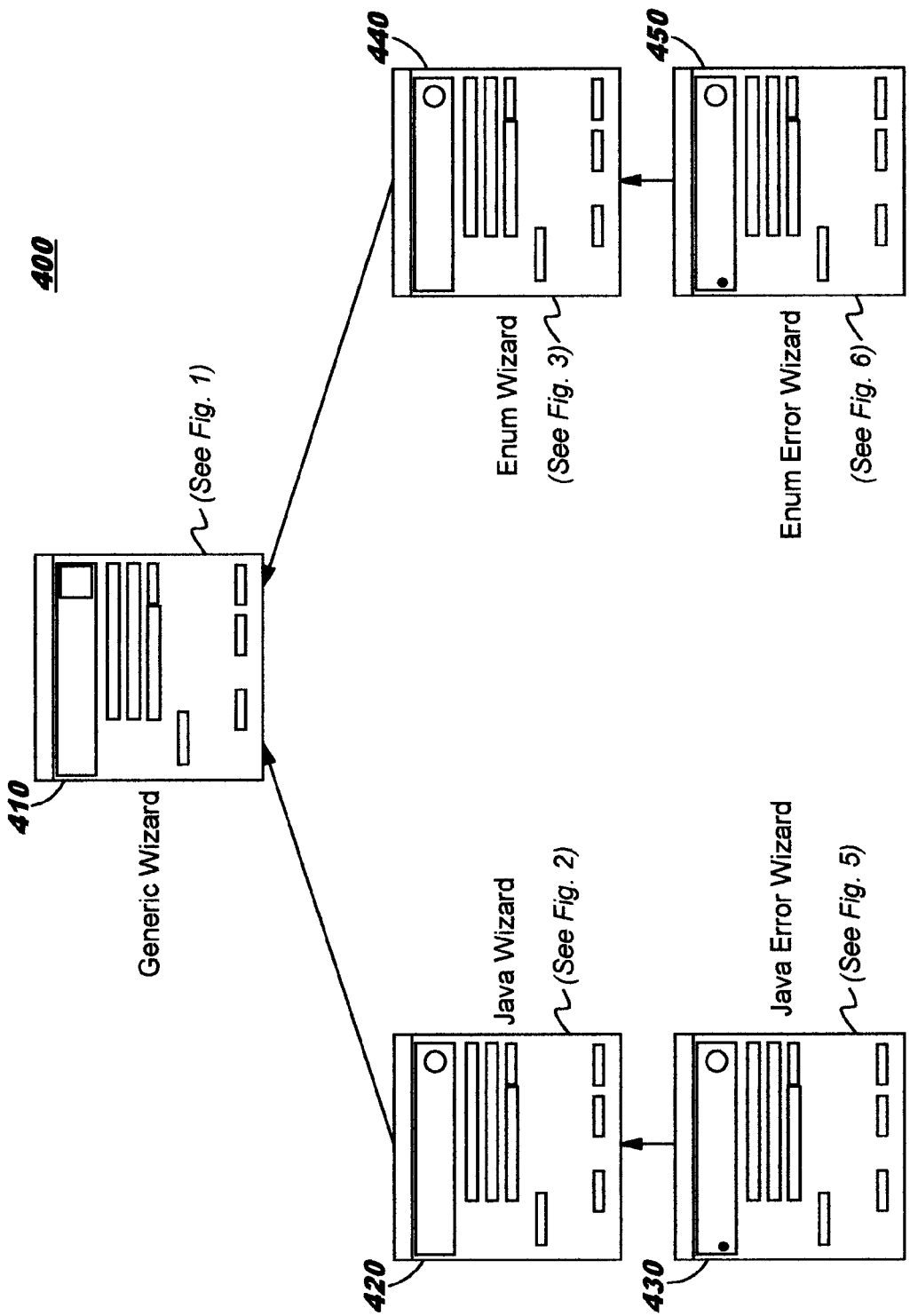
FIG. 4 shows an inheritance hierarchy of wizard dialogs.

FIG. 4 shows a hierarchy 400 in which the sample generic wizard dialog 100 of FIG. 1 forms the root, or base, of the hierarchy as shown at 410. The sample Java wizard 200 of FIG. 2 is shown as a child 420 which overrides its parent 410 (i.e., the generic wizard dialog 100), and the sample enumerated type wizard 300 of FIG. 3 is shown as another child 440 which provides a different set of overrides to parent 410.

Figure 5:
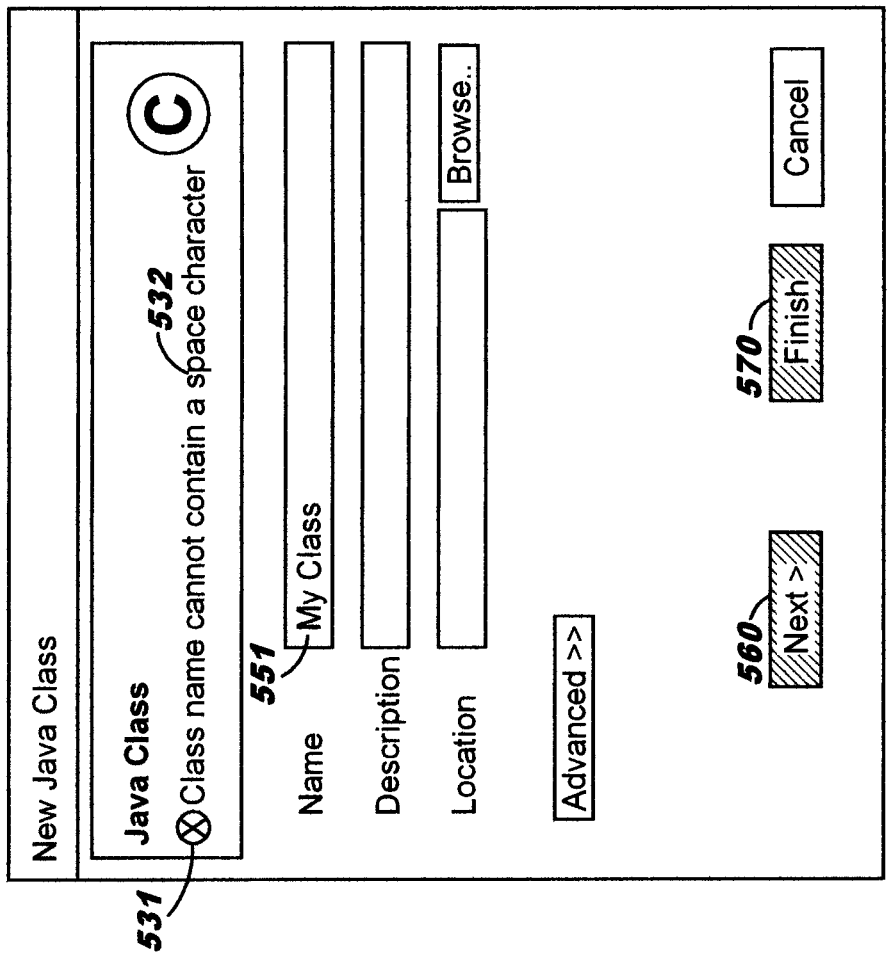
FIGS. 5-6 illustrate a Java error wizard and an enumerated type error wizard, respectively.

As discussed above, it may be desirable to have a version of the wizard dialog for representing an error state. One such error state may occur when a user types an invalid Java class name into the Java class wizard 200 of FIG. 2. This is illustrated in FIG. 5, where an impermissible blank space is typed in the class name "My Class" as shown at reference number 551. To communicate this error to the user, the Java class wizard 200 is replaced by the Java error wizard 500. As compared to wizard 200, the error wizard 500 overrides properties of wizard 200 as follows: an icon 531 comprising an "X" within a red circle (e.g., to indicate an error condition) and an error message 532 are displayed instead of message 230; the "Next" button 260 is overridden with a grayed-out "Next" button 560 which cannot be activated by the user; and similarly, the "Finish" button 270 is overridden with a grayed-out "Finish" button 570. (By way of drafting convenience, use of hash marks is intended to represent the "graying out" of graphical buttons.) Note that the overrides 560, 570 actually override values 160, 170 from the generic wizard dialog 100, which were inherited by (and not overridden by) Java class wizard 200.

Figure 6:
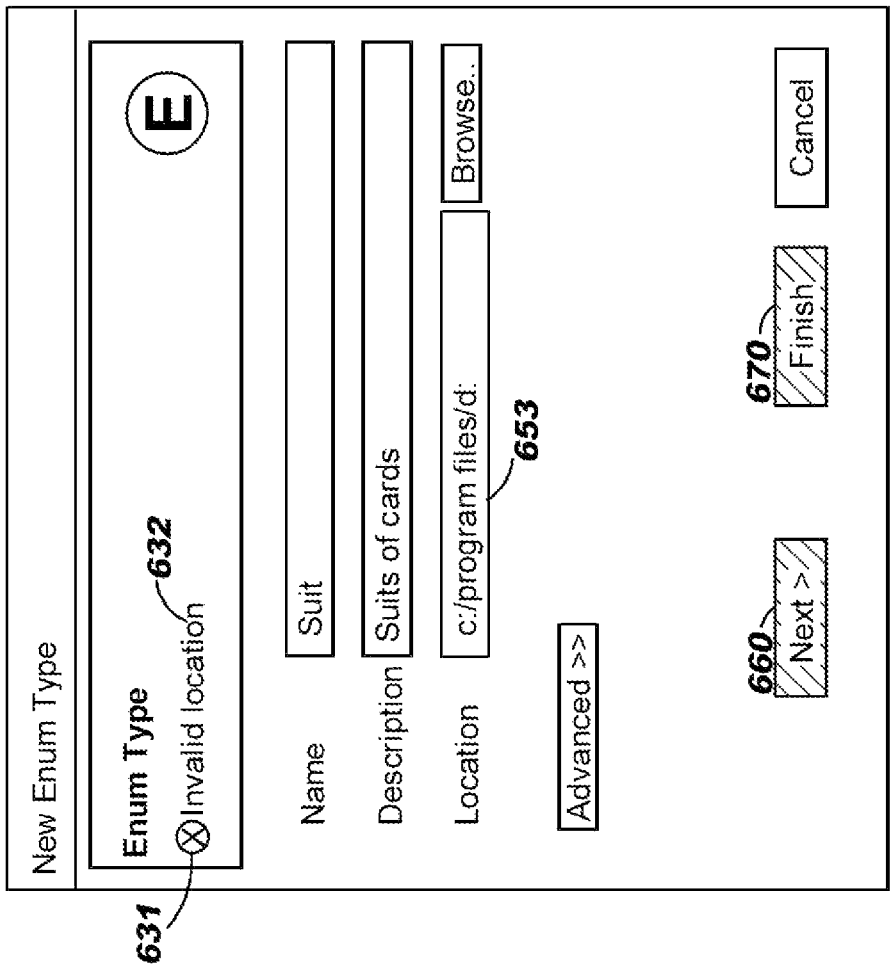

A different error state occurs when a user types an invalid location into the enumerated type wizard 300 of FIG. 3. This is illustrated in FIG. 6, where an impermissible path "C:/ program files/d:" is typed in the Location field, as shown by reference number 653. To communicate this error to the user, the enumerated type wizard 300 is replaced by the enumerated type error wizard 600. As compared to wizard 300, the error wizard 600 overrides properties of wizard 300 as follows: an icon 631 comprising an "X" within a red circle and an error message 632 are displayed instead of message 330; the "Next" button 360 is overridden with a grayed-out "Next" button 660 which cannot be activated by the user; and similarly, the "Finish" button 370 is overridden with a grayed-out "Finish" button 670. Note that the overrides 660, 670 actually override values 160, 170 from the generic wizard dialog 100, which were inherited by (and not overridden by) enumerated type wizard 300.

Referring again to the hierarchy 400 in FIG. 4, the Java error wizard 500 of FIG. 5 is depicted as a child 430 which overrides its parent 420 (i.e., the Java class wizard 200 of FIG. 2), and the enumerated type error wizard 600 of FIG. 6 is depicted as a child 450 which overrides its parent 440 (i.e., the enumerated type wizard 300 of FIG. 3). Each of the error wizards shown at 430, 450 also has as an ancestor the generic wizard dialog 100 of FIG. 1, which is represented by root node 410 of FIG. 4.

Suppose that the software developer decides that a large red exclamation point graphic would be more effective than the encircled red "X" icon shown at 531 of FIGS. 5 and 631 of FIG. 6. One approach is for the developer to find each error wizard and change its properties to use this new graphic. However, the hierarchy of a storyboard may be far more complex than the simple example provided in FIG. 4, and there may be many different versions of the error wizard beyond the two that are shown at 430, 450 of the example hierarchy 400. It may be difficult to locate each wizard that needs to be changed, and to maintain the overrides consistently (if the developer subsequently changes his or her mind, for example, and decides to restore the icons 531, 631).

An embodiment of present invention provides what is termed herein a "variation". The variation is a group of related changes, for component reuse. In the general case, a variation may be defined at any level of an inheritance chain. Use of a variation for changing a version of a component will now be discussed with reference to FIGS. 7-9.

Figure 7:
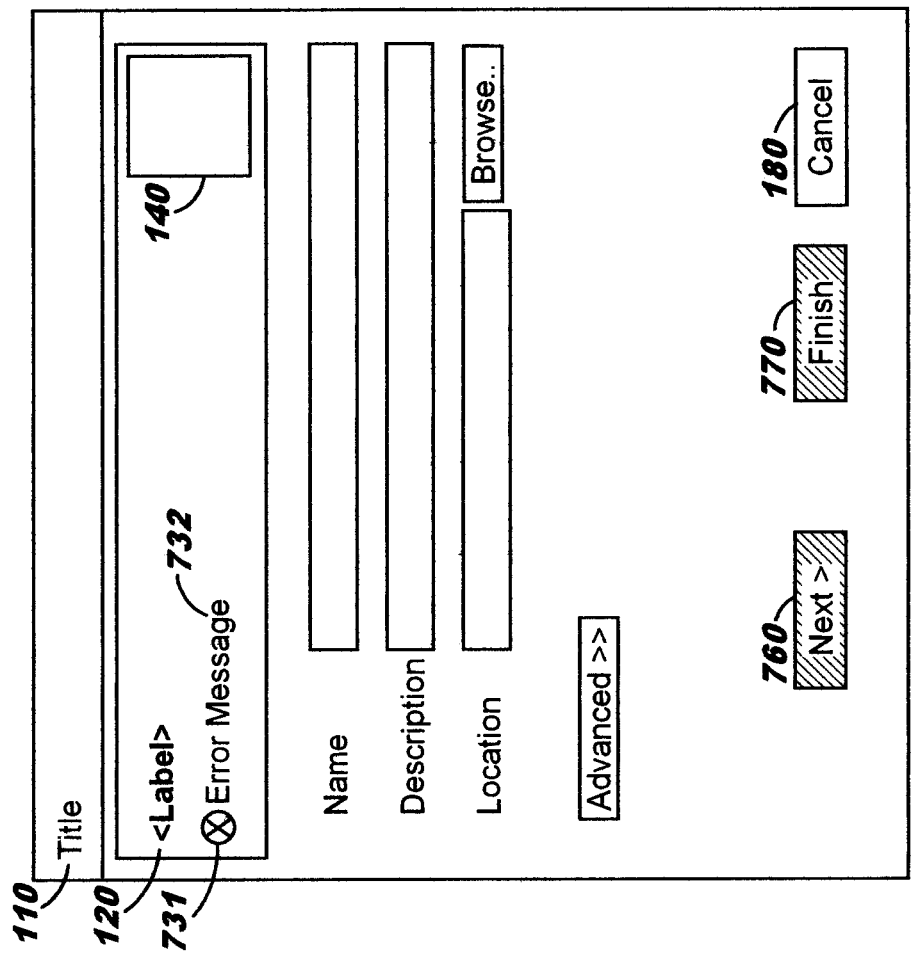
FIG. 7 illustrates a sample dialog wizard designed as a variation of the generic dialog wizard of FIG. 1.

FIG. 7 shows a sample dialog wizard 700 designed as a variation of the generic dialog wizard 100 of FIG. 1. As can be seen by inspection, some parts of wizard 100 are inherited in the variation depicted at 700, while other parts are overridden. For example, dialog 700 retains the title placeholder 110, the label placeholder 120, and the default icon 140. The "Next" button 160 is overridden with a grayed-out "Next" button 760 in the variation and the "Finish" button 170 is also overridden with a grayed-out "Finish" button 770, while the "Cancel" button 180 is inherited. Notably, the overrides in sample dialog 700 further comprise overriding the description placeholder 130 with an icon 731 for indicating an error and a text string 732; however, instead of using an actual error message for the override as illustrated at 532 and 632, the variation uses a generic text string for the override shown at 732. Using techniques disclosed herein, variation 700 may be used as a base or parent from which multiple error dialogs can be derived through reuse.

Figure 8:
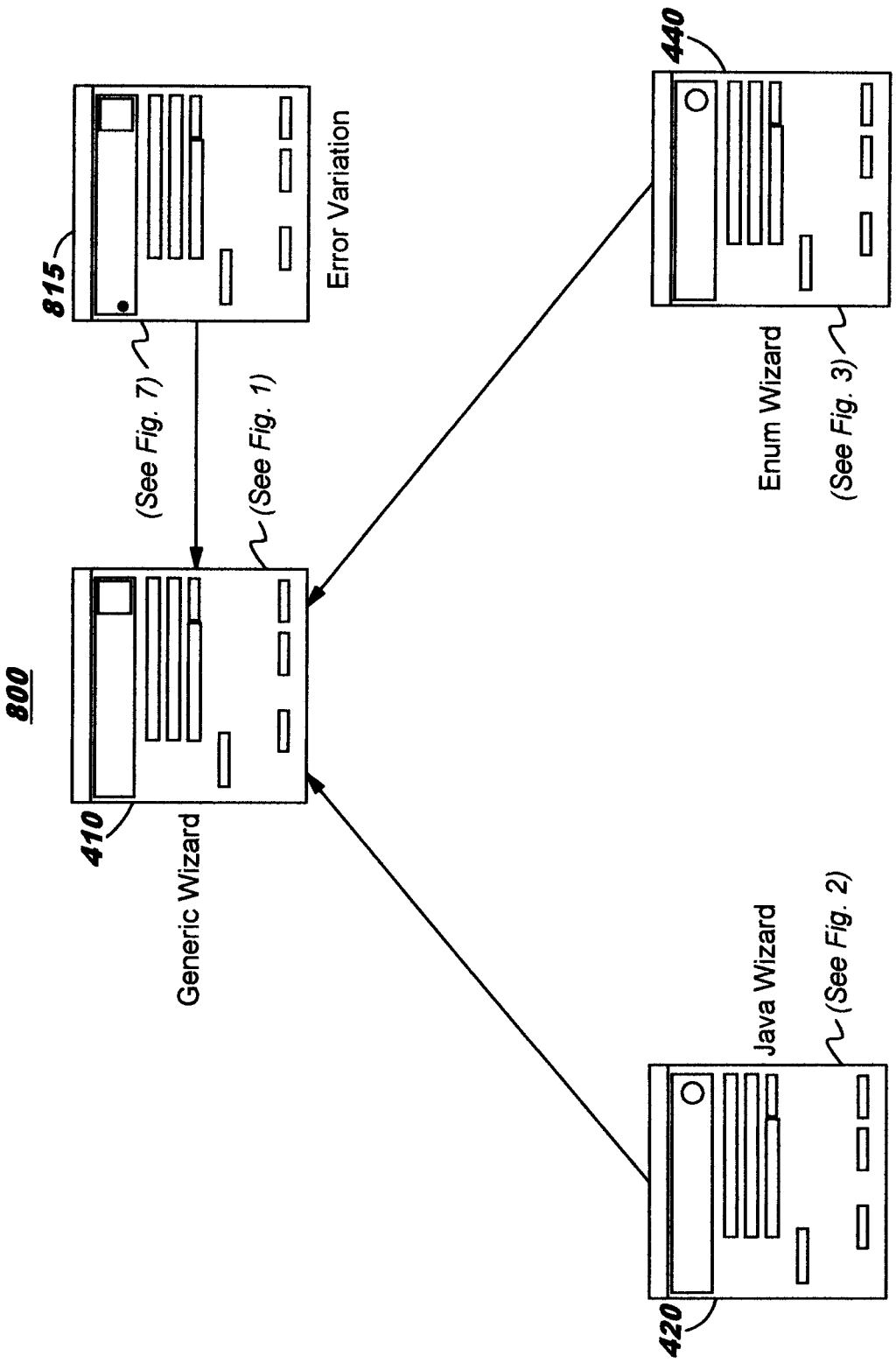
FIG. 8 shows how the variation depicted in FIG. 7 relates to the generic wizard dialog of FIG. 1 and its two derived dialogs which are shown in FIGS. 2-3.

FIG. 8 shows the variation 700 of FIG. 7 in relation to the generic wizard dialog 100 of FIG. 1 and its two derived dialogs 200 of FIGS. 2 and 300 of FIG. 3. The generic wizard dialog 100 of FIG. 1 again forms the root 410 of hierarchy 800, as in the hierarchy 400 of FIG. 4, and the Java class wizard 200 of FIG. 2 and the enumerated type wizard 300 of FIG. 3 are shown as children 420, 440, respectively, of this root. Now, however, variation 700 of FIG. 7 is shown at 815 as being related to, and derived from, the root 410. In this approach, as contrasted to child nodes 430, 450 of FIG. 4, error dialogs may be changed more easily and in a more consistent manner by defining the changes in the variation 700.

Figure 9:
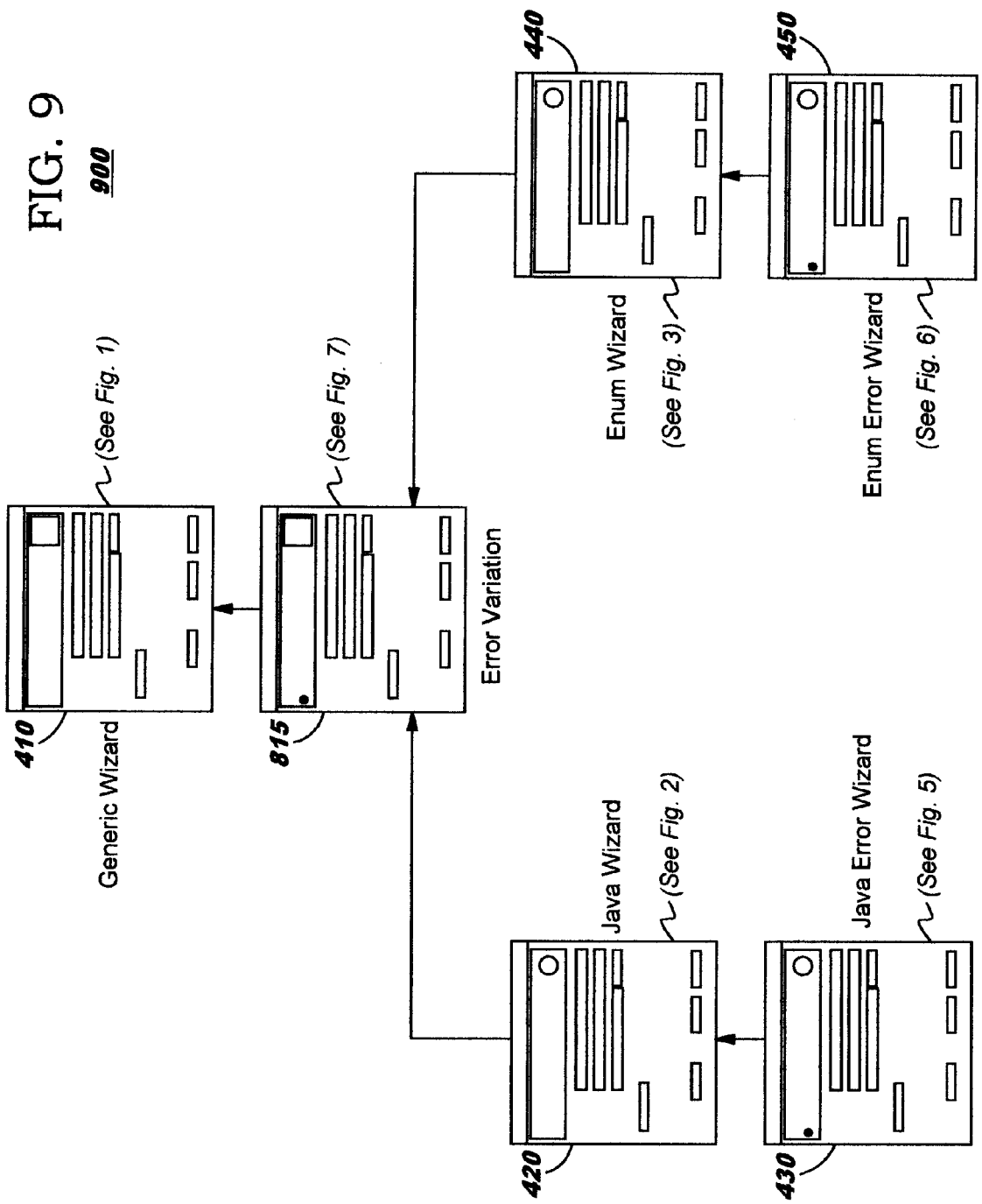
FIG. 9 provides a class hierarchy depicting an effective result of using a variation for error dialogs.

FIG. 9 provides a hierarchy that shows an effective result of using a variation for error dialogs. Hierarchy 900 again has generic wizard dialog 100 of FIG. 1 as its root 410, and this root 410 is now depicted with a single child 815 that corresponds to variation 700 of FIG. 7. The Java wizard dialog 200 of FIG. 2 and the enumerated type wizard 300 of FIG. 3 are now shown as children 420, 440, respectively, of node 815. The Java error wizard of FIG. 5 is again depicted as a child 430 which overrides its parent 420 (i.e., the Java class wizard 200 of FIG. 2), and the enumerated type error wizard of FIG. 6 is again depicted as a child 450 which overrides its parent 440 (i.e., the enumerated type wizard 300 of FIG. 3). As contrasted to the inheritance of overridden properties by child nodes from parent nodes according to the hierarchy 400 of FIG. 4, however, the hierarchy 900 of FIG. 9 uses what may be termed "selective inheritance", whereby the overrides are selectively applied. Note, for example, that the variation 700 which corresponds to node 815 overrides the "Next" button 160 to display it in a grayed-out form as shown at 760. Because the Java class dialog 200 which is represented by child node 420 inherits from the variation 700 that corresponds to node 815, a standard inheritance approach would result in a grayed-out "Next" button being inherited by dialog 200. This is undesirable, however, because dialog 200 does not represent an error state. With the selective application of overrides as disclosed herein, the Java wizard dialog 200 of FIG. 2 does not need to explicitly define an override for restoring the grayed-out "Next" button 760 which appears in the variation 700 to a normal "Next" button as shown at 260 of FIG. 2. Instead, the overrides defined as a variation can be turned on and off from one frame to another, while still preserving the ability to inherit property values from an ancestor, as will now be described. (When error dialogs are not applied, the actual inheritance chain differs from that shown in FIG. 9.)

Referring again to the Java class wizard 200 of FIG. 2 and corresponding Java error wizard 500 of FIG. 5, by way of review, the wizard 200 is presented to the user with no data entered therein, and wizard 500 represents entry of an invalid class name at shown at reference number 551. Now suppose that the developer of the storybook wishes to continue the scenario by depicting what happens when the user corrects the error in the class name. This is illustrated by wizard dialog 1000 of FIG. 10. See reference number 1051, where the blank space has now been removed from the class name. Notably, dialog 1000 shows that the error icon 531 and error message 532 are removed, and the original description shown at 230 of FIG. 2 is now restored. Rather than overriding the properties 531, 532, however, this restoring of description 230 occurs by turning off the variation 700 that provides error state information for error wizard 500.

Figure 10:
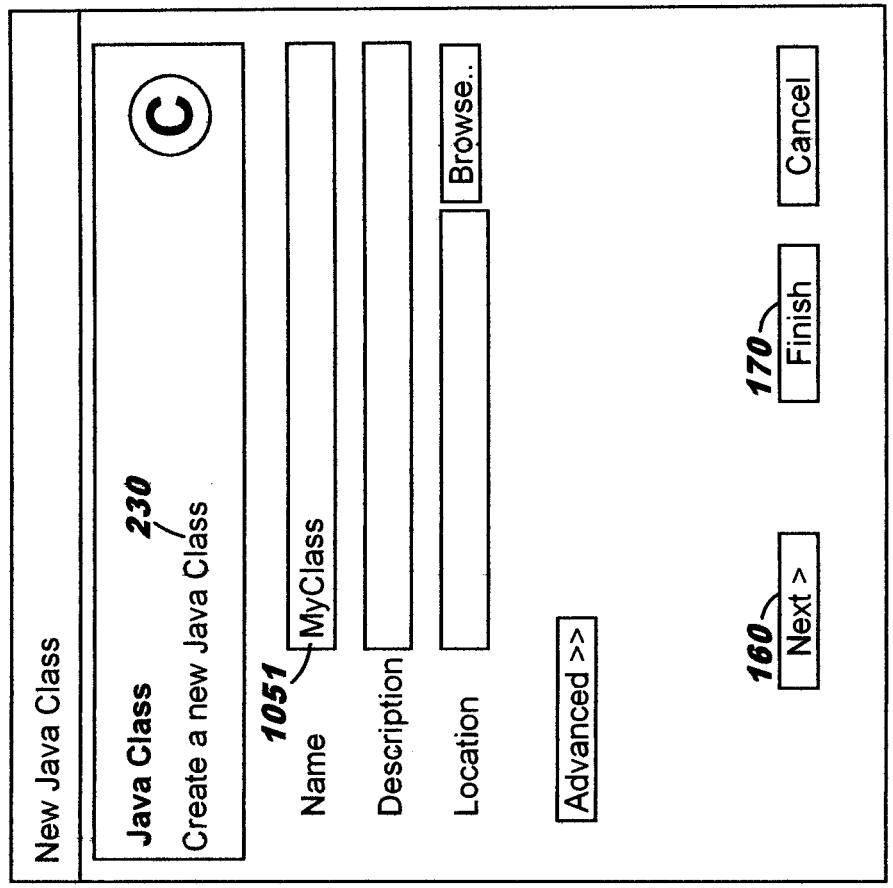
FIGS. 10-11 illustrate additional examples of a Java class wizard and Java error wizard, respectively.
Figure 11:
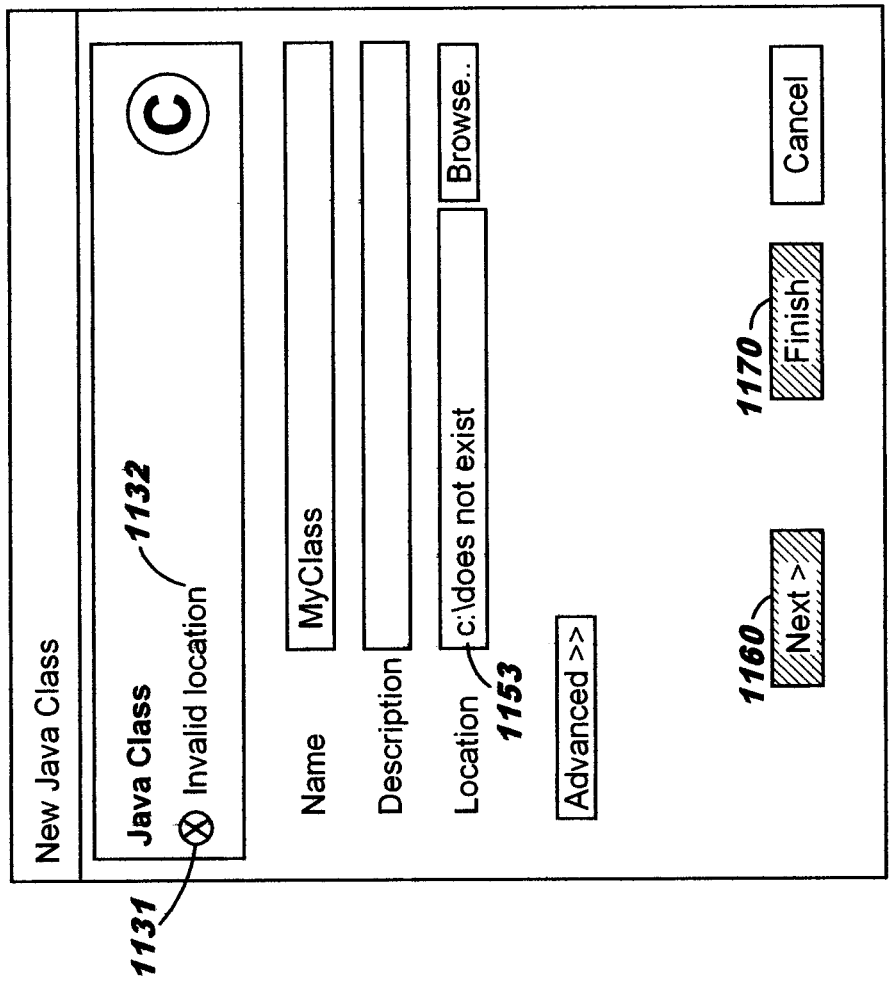

Further suppose that the developer of the storyboard wants to continue the scenario of FIGS. 2, 5, and 10 by illustrating another potential error that might occur following display of dialog 1000 of FIG. 10. This is shown in FIG. 11, which illustrates another sample Java error wizard 1100. This time, the error is impermissible blank spaces in the value 1153 of the "Location" field. The error wizard 1100 therefore displays an error icon 1131 and an error message 1132 instead of message 230, and shows the grayed-out version of the "Next" button and "Finish" button (see 1160 and 1170, respectively).

Figure 12:
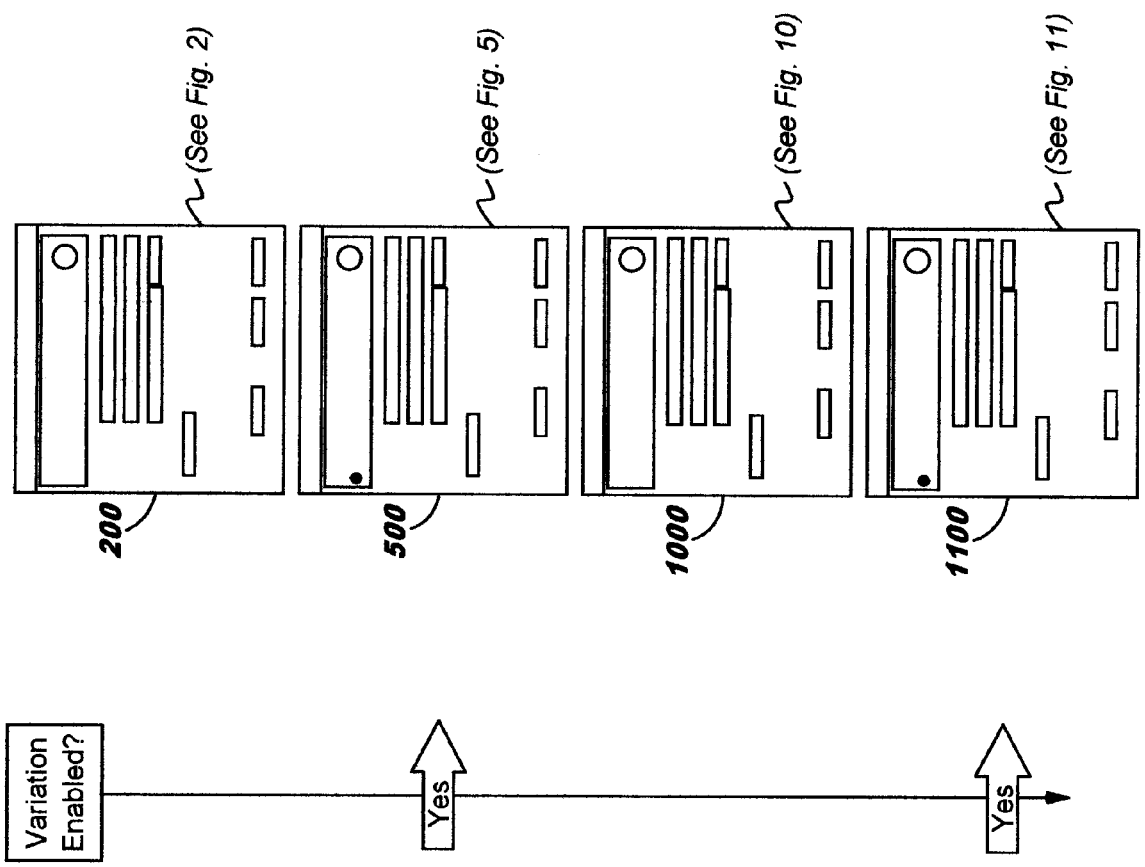
FIG. 12 summarizes the sequence of dialogs displayed to the user according to FIGS. 2, 5, 10, and 11, where the user alternates (in this example) between seeing dialogs with valid data and dialogs with error conditions.

FIG. 12 summarizes the sequence of dialogs displayed to the user according to FIGS. 2, 5, 10, and 11, where the user alternates (in this example) between seeing dialogs with valid data and dialogs with error conditions. That is, the error state variation is turned on for FIGS. 5 and 11, and is turned off for FIGS. 2 and 10. As may be imagined, a user interaction scenario being illustrated with a storyboard might contain a number of dialogs to show various error conditions, and thus the 4-dialog sequence illustrated by FIG. 12 might continue with a large number of other dialogs. Using techniques disclosed herein, the error state variation illustrated in FIG. 7 can be turned on and off, making the error-related overrides selectively applicable to appropriate ones of these dialogs.

An embodiment of the present invention enables turning the variations on and off through use of key values, as will now be described. Each part is assigned a unique key which can be used to keep track of that part. These unique keys may comprise universally unique identifiers of the well-known "UUID" format. Alternatively, unique key values may be generated in other ways. When a part is reused, the new instance created by the reuse gets a new unique key. For any lower-level parts of which that new instance is composed, those which are inherited from the reused part have their unique keys prefixed with the unique key of the new instance. This allows reusing a part multiple times in the same sketch while still being able to distinguish among the multiple reuses. For a frame that is derived from another (parent) frame, the inherited parts which are not overridden in the (child) frame keep their original key value since a frame can only directly inherit from one other frame. In the case where an inherited part overrides property values of its parent, a variation for that part is persisted with its key and the overridden property values.

FIGS. 13-15 provide sample Extensible Markup Language ("XML") documents to illustrate one approach to use of unique keys for variations. Document 1300 of FIG. 13 corresponds to dialog 200 in FIG. 2 (which is represented by node 420 in the hierarchy 800 of FIG. 8). Note also that FIGS. 13-15 correspond to the sequence of dialogs 200, 500, 1000 as illustrated in FIG. 12. In document 1300, a diagram element 1301 has a "uuid" attribute 1302 that stores a unique key value to uniquely identify the diagram part defined by element 1301. The diagram element 1301 has two child elements, namely a contents element 1305 and a variation element 1380. The contents element 1305 in turn contains a dialog element 1306, and in this example, the dialog element 1306 includes an element 1310 that specifies as its value the dialog title shown at 210 of FIG. 2; an element 1320 that specifies the panel title shown at 220 of FIG. 2; and button elements 1360, 1370 that specify the "Next" and "Finish" buttons as shown at 260, 270 of FIG. 2.

The panel element 1320 of this example includes an image element 1331 and a label element 1332. The image element 1331 has a "src" attribute that specifies an identifier of an error icon, such as icon 531 of FIG. 5. Note that the image element 1331 has a "key" attribute, which has a sample value of "52140", and a "visible" attribute which is set to false, thereby indicating that the error icon is not visible when rendering this dialog. The label element 1332 has a "name" attribute that specifies "Error Message", which may be rendered (for example) at 532 of FIG. 5. Label element 1332 also has a "key" attribute, which has a sample value of "49302", and a "visible" attribute which is also set to false, thereby indicating that the error message is not visible when rendering this dialog. Button elements 1360, 1370 also have "key" attributes with corresponding values "23210" and "90210" in this example.

Variation element 1380 is provided in FIG. 13 to persist a set of overrides that can be selectively applied to a dialog rendered from FIG. 13. The variation element 1380 has an "id" attribute which is set to "V001" in the example. The overrides specified in variation element 1380 comprise an image element 1381, a label element 1382, and two button elements 1383, 1384. As can be seen by inspection, the value of the "key" attribute on image element 1381 corresponds to the key value on image element 1331; the value of the "key" attribute on label element 1382 corresponds to the key value on label element 1332; the value of the "key" attribute on button element 1383 corresponds to the key value on button element 1360; and the value of the "key" attribute on button element 1384 corresponds to the key value on button element 1370. The key values of the XML elements in variation element 1380 thereby identify another XML element whose value is to be selectively overridden. In this example, whereas the "visible" attribute is set to false on image element 1331, a "visible" attribute on image element 1381 is set to true for the variation; similarly, while the "visible" attribute is set to false on label element 1332, a "visible" attribute on label element 1382 is set to true for the variation. The variation element 1380 thus specifies overrides for the "visible" attributes of 1331, 1332 and in this example, those overrides indicate that the error icon and error message (as illustrated by 531, 532 of FIG. 5) are to be visible in the dialog when the variation is turned on. The button elements 1383, 1384 in the variation element 1380 specify overrides for button elements 1360, 1370, and indicate that the corresponding buttons (as illustrated by 560, 570 of FIG. 5) are to be disabled in the dialog when the variation is turned on.

Document 1400 of FIG. 14 corresponds to variation 500 in FIG. 5, and specifies values that override corresponding values in parent document 1300 of FIG. 13. Note that the parent document 1300 is identified from document 1400 by specifying the unique key of the parent as the value of "master" attribute 1402 on diagram element 1401; see also the matching value "dhw3jd3j" of the "uuid" attribute 1302 of FIG. 13. Diagram element 1401 has a "uuid" attribute 1403 that stores a unique key value to uniquely identify the diagram part defined by element 1401. The diagram element 1401 has one child element, namely an overrides element 1405. A number of overrides may be specified as child elements of this overrides element 1405. In this example, overrides are illustrated for defining differences between dialog 200 of FIG. 2 and dialog 500 of FIG. 5. In particular, the text value "My Class" is specified for label element 1451, where this text value will be displayed at 551 of FIG. 5 when these overrides 1405 are turned on, and the text string "Class name cannot contain a space character" is specified as the value of label element 1452, where this text string will be displayed at 532 of FIG. 5 when the overrides 1405 are turned on. See the value of the "key" attribute for element 1452, which matches the value of the key attribute for element 1332; for drafting convenience, the element being overridden by label element 1451 is not illustrated in FIG. 13 (as can be determined by absence of an element having a key value of "78772" in FIG. 13). Also note that the variation element 1490 of FIG. 14 has an "id" attribute whose value matches the value of the "id" attribute of variation element 1380, and the "enabled" attribute of variation element 1490 specifies that the variation is enabled. Thus, element 1490 indicates that the overridden properties specified in the variation element 1380 are to be turned on for dialogs derived according to FIG. 14, in addition to the overrides specified at 1405.

Document 1500 of FIG. 15 corresponds to dialog 1000 in FIG. 10, and specifies values that override corresponding values in parent document 1400 of FIG. 14. Document 1500 identifies its parent document 1400 by specifying the unique key of the parent as the value of "master" attribute 1502 on diagram element 1501; see also the matching value "xyz27dh1" of "uuid" attribute 1403 of FIG. 14. Diagram element 1501 does not have its own "uuid" attribute, in this example, because it has not been overridden. The diagram element 1501 has, as its only child element, an overrides element 1505. In this example, a label element 1551 is illustrated as a child element of the overrides element 1505, and defines differences between dialog 500 of FIG. 5 and dialog 1000 of FIG. 10. In particular, the text value "MyClass" is specified as the text value for label element 1551, where this text value will be displayed at 1051 of FIG. 10 when these overrides 1505 are turned on. See the value of the "key" attribute for element 1551, which matches the value of the key attribute for element 1451. Also note that the variation element 1590 of FIG. 15 has an "id" attribute whose value matches the value of the "id" attribute for variation element 1380, and the "enabled" attribute of variation element 1590 specifies that the variation is not enabled. Thus, element 1590 indicates that the overridden properties specified in the variation element 1380 are to be turned off for dialogs derived according to FIG. 15, while the overrides specified at 1505 are to be applied.

When a frame is to be displayed, it is necessary to determine the current values of the properties of that frame. Some of the properties may have been overridden by the frame, while others will be inherited from the parent frame or perhaps from an ancestor of the parent. Determining the current value, while providing selective application of overridden values according to a variation, occurs as will now be described.

In the general case, the first step comprises asking the frame to be displayed to return its overridden property values. All property values not overridden by the frame to be displayed are determined by recursively invoking parent frames until locating a value for that property. A part's unique key is used to find its parent, and in turn, the key of the parent is used in a recursive manner to locate each ancestor as needed.

Alternative processing may be provided for specific properties. As one example, it may be desirable to specify a font value that will be inherited by all contained parts. In this case, the property values are preferably determined by first checking to see whether the current part sets a value for the font property, and if so, that value will be used. Otherwise, each ancestor part is checked recursively to see if any ancestor sets this property. If so, then the located value is used. Otherwise, a chain of containers is recursively checked, starting from the current container, to see if the property is set therein. If so, then the located value is used. If these steps fail to locate a property value, then a default value is preferably used.

When a variation is encountered while searching for a property value, the value from the parent is located using the key value for the parent. If a variation is enabled, then the overridden values as specified in the variation are used to override corresponding values from the parent (where the corresponding values are identified using the key attributes); otherwise, if the variation is disabled, then the value from the parent is used. In effect, enabling and disabling a variation corresponds to adding and removing, respectively, a set of property values from the ancestor chain of a part. (The term "inheriting through" a component or variation, as used herein, refers to inheriting not only directly from that component or variation but also from its ancestors in an inheritance chain.) Notably, while variations may be defined in the original part, this is not required: wherever the part is reused, the developer can change the variation that is in effect and all overridden values from the part and its ancestor chain are automatically factored in with the overridden values from the variation.

Also note that the set of changes related to a variation is introduced before the first reuse. Suppose, by way of example, that a part includes a button having its label text set to "Go", and that a variation is defined for this part wherein the button has its label text set (i.e., overridden) to "Submit". If the part is reused in a frame, and that frame overrides the inherited "Go" text to replace it with "OK", then the chain of changes appears as follows:

original part: button text="Go"
variation on original part: button text="Submit"
reuse of original part: button text="OK"

In the reused part, the button will appear with its text set to "OK" in this scenario, because the change made in the reuse takes precedence over the variation. Suppose, by way of contrast, that the reuse is based on the variation instead of on the original part, and that the reusing frame does not define a new value for the button's text. In this scenario, the chain of changes is as follows:

original part: button text="Go"
variation on original part: button text="Submit"
reuse of original part: no definition for button text If the variation is enabled, then the text of the button in the reusing frame will be "Submit", as inherited from the variation. On the other hand, if the variation is not enabled, then the text of the button in the reusing frame will be "Go", as inherited from the original part. Note that the variation and/or the reusing frame might also override other properties of this same button part, in addition to its label, such as its color, font, or size.

While examples used herein refer primarily to variations affecting visual properties, this is by way of illustration and not of limitation. Other types of properties that might be selectively overridden using variations include (again, by way of illustration only) a sort order for data in a data structure, such that the data can be selectively sorted in different ways, and a filter definition for data from a data structure, such that the data can be selectively filtered using different filtering criteria.

Optionally, a variation may be based on another variation. Switching to that variation would then cause the set of changes from both variations to take effect. For example, the first variation might override values of a large number of properties, including a check box that is set to checked. If the software developer wishes to reuse this set of variations, except that the check box should be unchecked, then the second variation can be applied to the first variation (through use of the key values) with the overrides in the second variation providing for this unchecked check box.

Techniques disclosed herein enable flexibly turning variations on and off, as has been described. It will be noted that a frame using and/or inheriting variations still remains synchronized to the ancestors of that frame. Therefore, in cases where changes are subsequently made to an ancestor of a frame for which a variation is enabled, those changes will still be reflected in the frame unless overridden by an enabled variation or other ancestor.

Figure 16:
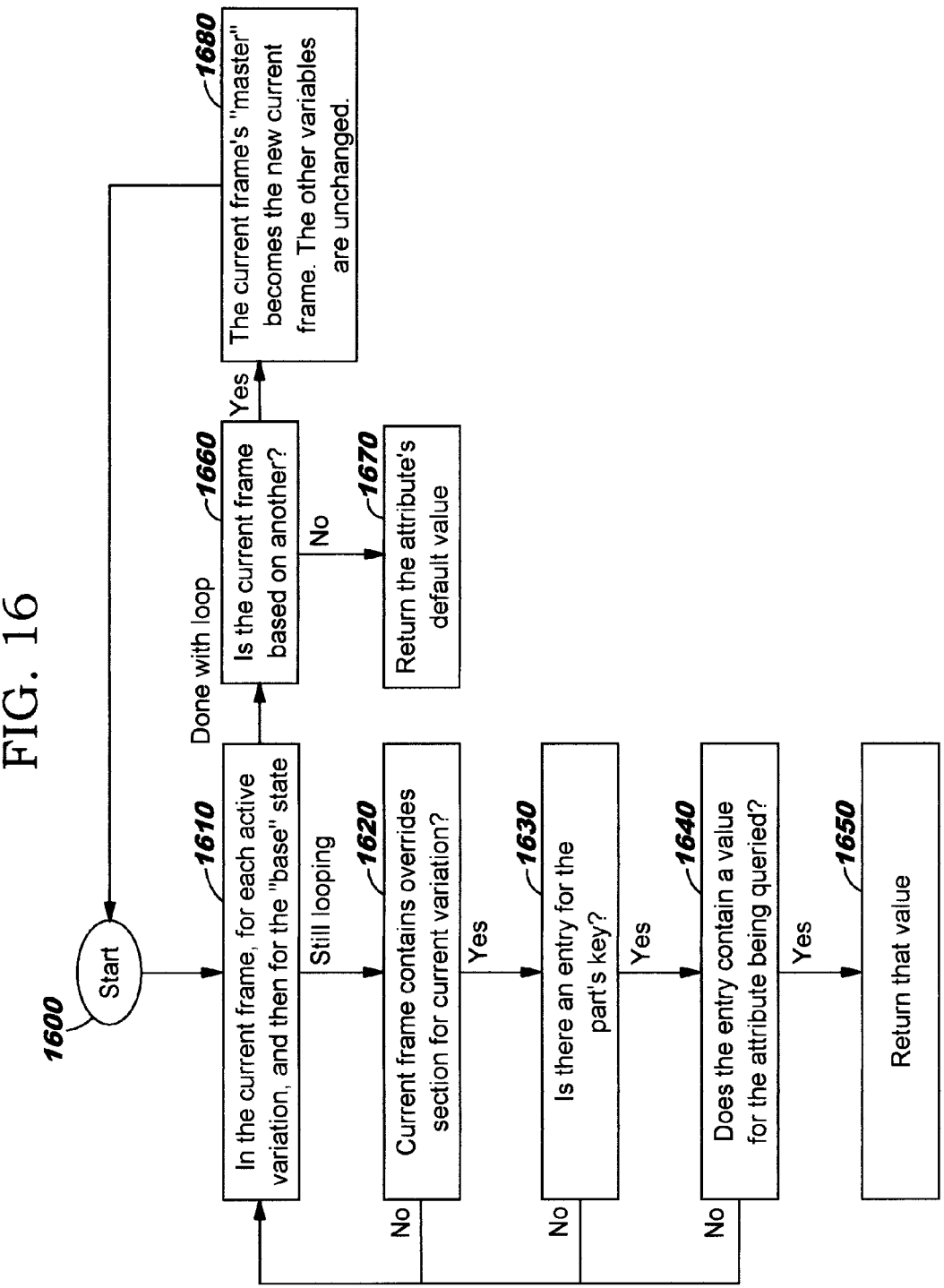
FIG. 16 provides a flowchart depicting logic which may be used when implementing an embodiment of the present invention.

FIG. 16 provides a flowchart depicting logic which may be used when implementing an embodiment of the present invention. As shown therein, Blocks 1600-1680 provide a loop that operates recursively to locate a value for each inherited property of a current frame, which may require querying not only the property values of the current frame but also its ancestors (including enabled variations). Note that the highest-level ancestor, or root, in the inheritance hierarchy may be considered a variation that is always enabled. Parameters which may be used for the processing depicted in FIG. 16 are shown at 1690.

The process begins at Block 1610 by invoking a loop that operates for the current frame, attempting to find a property value for each inherited property of the frame. (Note that if the current frame specifies an overriding value for the attribute of interest, then invocation of the resolution algorithm shown in FIG. 16 is not necessary.) If the loop at Blocks 1610-1650 finishes without finding a value for a particular property, control transfers to Block 1660; however, until such time, processing for a queried attribute which has not yet been resolved continues at Block 1620 which tests whether the current frame contains an overrides section referring to a currently-enabled variation. This may be desirable, for example, for overrides that are specific to a particular variation; those overrides can then be stored in an overrides section for the variation to which they apply. In this manner, a frame can extend the definition of a variation it has inherited. Accordingly, if the test at Block 1620 has a negative result, then control returns to Block 1610 (which will subsequently cause a transfer of control to Block 1660 in order to begin another iteration using an ancestor node in the inheritance hierarchy). Otherwise, when the overrides section is present (i.e., Block 1620 has a positive result), control transfers to Block 1630.

At Block 1630, a test is made as to whether there is an entry in the overrides section of the current frame that pertains to the key of the current part. If not, then control returns to Block 1610 (which will subsequently cause a transfer of control to Block 1660 in order to begin another iteration using an ancestor node in the inheritance hierarchy). Otherwise, processing continues at Block 1640. Block 1640 tests whether the located entry in the overrides section contains a value for the attribute (i.e., property) being queried according to FIG. 16. For example, if the processing of FIG. 16 is attempting to determine whether a button is to be grayed out or not, Block 1640 tests whether the located entry from the overrides section has a value for an "enabled" attribute of this button. When the test at Block 1640 has a negative result, control returns to Block 1610 to begin processing another attribute of the current frame. Otherwise, a value has been located, and that value is returned at Block 1650.

Control reaches Block 1660 when the iteration of Blocks 1610-1650 has ended without locating a value for the queried attribute, and Block 1660 then tests whether the current frame is based on (i.e., derived from) another frame. If so, then processing continues at Block 1680, which uses the value of the "master" attribute of the current frame to locate the frame's parent. This parent frame then becomes the current frame, and control returns to Block 1600 to begin searching that frame. Otherwise, when the current frame is not derived from another, the top of the inheritance hierarchy has been reached without finding a value for the queried attribute, and Block 1670 sets the attribute value to a default.

As noted earlier, a variation may be defined at any level of an inheritance chain. In a wizard dialog scenario as illustrated herein, for example, a Java wizard might be defined as a component that inherits from a generic wizard dialog component, and a variation might be defined on the Java wizard component. This variation could then be applied to instances that reuse the Java wizard component, and other variations— such as an error variation on the generic wizard component— might also be turned on or off when using the variation. The manner in which such scenarios may be defined will be readily understood to one of skill in the art, based on the disclosures provided herein.

An embodiment of the present invention may be used in a programming language. Methods or functions may be considered as components, while classes (which are a collection of methods or functions) may be considered as wireframes, and sub-classes overriding a method that calls a super-method may be considered as a new version of a component. Turning a variation on or off may be considered as analogous to adding or removing a method in the class hierarchy.

Figure 17:
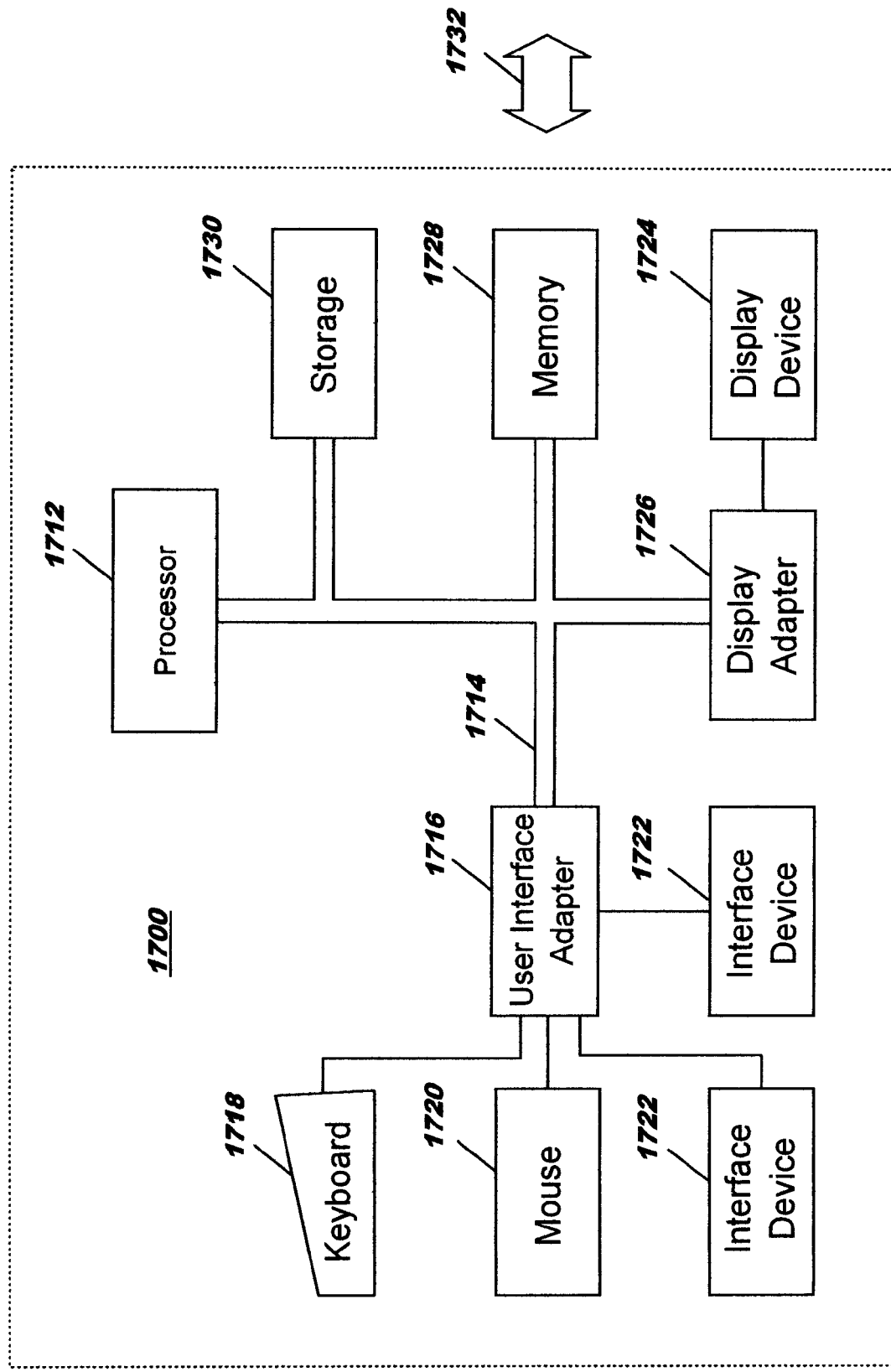
FIG. 17 depicts a data processing system suitable for storing and/or executing program code.

Referring now to FIG. 17, a data processing system 1700 suitable for storing and/or executing program code includes at least one processor 1712 coupled directly or indirectly to memory elements through a system bus 1714. The memory elements can include local memory 1728 employed during actual execution of the program code, bulk storage 1730, and cache memories (not shown) which provide temporary storage of at least some program code in order to reduce the number of times code must be retrieved from bulk storage during execution.

Input/output ("I/O") devices (including but not limited to keyboards 1718, displays 1724, pointing devices 1720, other interface devices 1722, etc.) can be coupled to the system either directly or through intervening I/O controllers or adapters (1716, 1726).

Network adapters may also be coupled to the system to enable the data processing system to become coupled to other data processing systems or remote printers or storage devices through intervening private or public networks (as shown generally at 1732). Modems, cable modem attachments, wireless adapters, and Ethernet cards are just a few of the currently-available types of network adapters.

Figure 18:
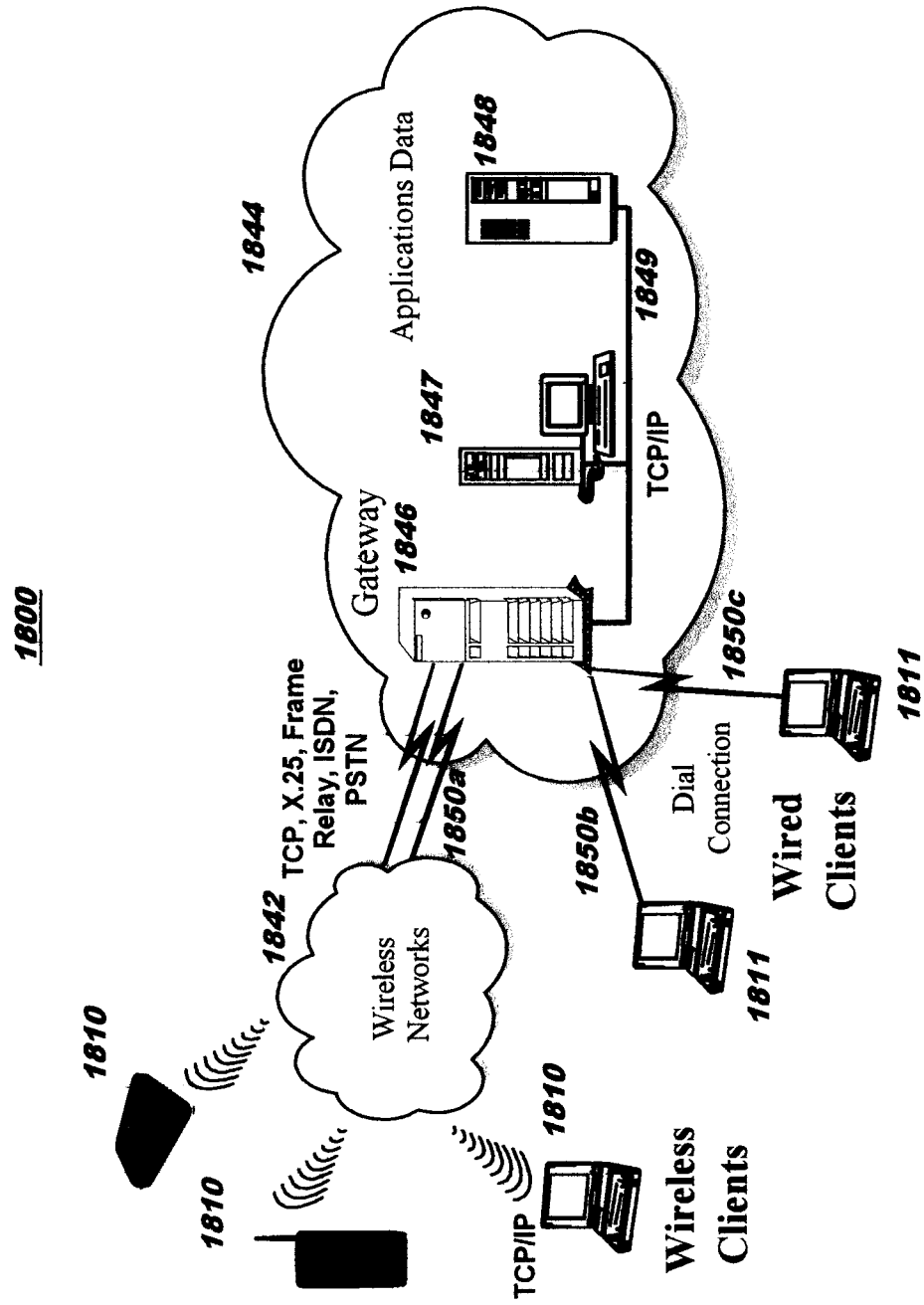
FIG. 18 depicts a representative networking environment in which one or more embodiments of the present invention may be used.

FIG. 18 illustrates a data processing network environment 1800 in which the present invention may be practiced. The data processing network 1800 may include a plurality of individual networks, such as wireless network 1842 and wired network 1844. A plurality of wireless devices 1810 may communicate over wireless network 1842, and a plurality of wired devices, shown in the figure (by way of illustration) as workstations 1811, may communicate over network 1844. Additionally, as those skilled in the art will appreciate, one or more local area networks ("LANs") may be included (not shown), where a LAN may comprise a plurality of devices coupled to a host processor.

Still referring to FIG. 18, the networks 1842 and 1844 may also include mainframe computers or servers, such as a gateway computer 1846 or application server 1847 (which may access a data repository 1848). A gateway computer 1846 serves as a point of entry into each network, such as network 1844. The gateway 1846 may be preferably coupled to another network 1842 by means of a communications link 1850a. The gateway 1846 may also be directly coupled to one or more devices 1811 using a communications link 1850b, 1850c, and/or may be indirectly coupled to such devices. The gateway computer 1846 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1846 may also be coupled 1849 to a storage device (such as data repository 1848).

Those skilled in the art will appreciate that the gateway computer 1846 may be located a great geographic distance from the network 1842, and similarly, the devices 1810, 1811 may be located some distance from the networks 1842 and 1844, respectively. For example, the network 1842 may be located in California, while the gateway 1846 may be located in Texas, and one or more of the devices 1810 may be located in Florida. The devices 1810 may connect to the wireless network 1842 using a networking protocol such as the Transmission Control Protocol/Internet Protocol ("TCP/IP") over a number of alternative connection media, such as cellular phone, radio frequency networks, satellite networks, etc. The wireless network 1842 preferably connects to the gateway 1846 using a network connection 1850a such as TCP or User Datagram Protocol ("UDP") over IP, X.25, Frame Relay, Integrated Services Digital Network ("ISDN"), Public Switched Telephone Network ("PSTN"), etc. The devices 1811 may connect directly to the gateway 1846 using dial connections 1850b or 1850c. Further, the wireless network 1842 and network 1844 may connect to one or more other networks (not shown), in an analogous manner to that depicted in FIG. 18.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on the user's device and partly on a remote computer. The remote computer may be connected to the user's device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for selectively applying overrides to values defined in a version of a component, comprising:
   obtaining a specification of the component, the specification defining a plurality of properties of the component and for each of the plurality of properties, a corresponding value;
   defining a variation of the component as being derived from and inheriting through the component, the variation comprising, for each of a first subset of the plurality of properties of the component, an override to the corresponding value thereof;
   upon a reuse of the component that creates a new version thereof, defining the new version as derived from the variation, wherein the new version comprises, for each of a second subset of the plurality of properties of the component, an override to the corresponding value thereof, wherein the corresponding value of at least one of the plurality of properties of the component is overridden in both the first subset and the second subset; and
   determining resulting values of the plurality of properties in the new version by selectively applying the overrides, further comprising:
      for each property not in the first subset or the second subset, determining the resulting value as the value defined in the component specification;
      for each property in the second subset, determining the resulting value as the overridden value defined in the new version; and
      for each property in the first subset but not in the second subset, recursively searching each ancestor in an inheritance chain in which the component is an ancestor of the variation and of the new version until locating a specified value for the property, wherein:
         the variation occurs in the inheritance chain as an ancestor of the new version if the variation is turned on, thereby determining the resulting value as the overridden value defined in the variation; and
         the variation does not occur in the inheritance chain as the ancestor of the new version if the variation is turned off, thereby determining the resulting value as the value defined in the component specification.

2. The method according to claim 1, wherein a unique key value is associated with each of the overridden properties, the unique key value usable for linking the override for the value to the corresponding value of the property as defined in the component specification.

3. The method according to claim 1, wherein a unique key value identifies the variation and is associated with the new version to indicate that the new version is derived from the variation irrespective of whether the variation is turned on, the unique key value adapted to enable finding the variation, as the ancestor of the new version, in the inheritance chain when the variation is turned on.

4. The method according to claim 1, wherein:
   a first unique key is associated with the component in the component specification;
   a second unique key is associated with the variation in the variation definition, the second unique key being prefixed by the first unique key to thereby link the variation to the component; and
   a third unique key is associated with the new version in the new version definition, the third unique key being prefixed by the second unique key to thereby link the new version to the variation and, through the linked variation, to the component.

5. The method according to claim 1, further comprising:
   upon a reuse of the new version that creates a new child version thereof, defining the new child version as derived from and inheriting through the new version, wherein the new child version comprises, for each of a third subset of the plurality of properties of the component, an override to the corresponding value thereof, wherein the corresponding value of at least one of the plurality of properties of the component is overridden in each of the first subset, the second subset, and the third subset; and
   determining resulting values of the plurality of properties in the new child version by selectively applying the overrides, further comprising:
      for each property not in the first subset, the second subset, or the third subset, determining the resulting value as the value defined in the component specification;
      for each property in the third subset, determining the resulting value as the overridden value defined in the new child version;
      for each property in the second subset but not in the third subset, determining the resulting value as the value defined in the new version; and
      for each property in the first subset but not in the second subset or the third subset, recursively searching each ancestor in an inheritance chain in which the component is an ancestor of the variation, of the new version, and of the new child version until locating a specified value for the property, wherein:
         the variation occurs in the inheritance chain as an ancestor of the new child version if the variation is turned on, thereby determining the resulting value as the overridden value defined in the variation; and
         the variation does not occur in the inheritance chain as the ancestor of the new child version if the variation is turned off, thereby determining the resulting value as the value defined in the component specification.

6. A system for selectively applying overrides to values defined in a version of a component, comprising:
   a computer comprising a processor; and
   instructions which are executable, using the processor, to implement functions comprising:
      obtaining a specification of the component, the specification defining a plurality of properties of the component and for each of the plurality of properties, a corresponding value;
      defining a variation of the component as being derived from and inheriting through the component, the variation comprising, for each of a first subset of the plurality of properties of the component, an override to the corresponding value thereof;
      upon a reuse of the component that creates a new version thereof, defining the new version as derived from the variation, wherein the new version comprises, for each of a second subset of the plurality of properties of the component, an override to the corresponding value thereof, wherein the corresponding value of at least one of the plurality of properties of the component is overridden in both the first subset and the second subset; and determining resulting values of the plurality of properties in the new version by selectively applying the overrides, further comprising:

for each property not in the first subset or the second subset, determining the resulting value as the value defined in the component specification;

for each property in the second subset, determining the resulting value as the overridden value defined in the new version; and for each property in the first subset but not in the second subset, recursively searching each ancestor in an inheritance chain in which the component is an ancestor of the variation and of the new version until locating a specified value for the property, wherein:

the variation occurs in the inheritance chain as an ancestor of the new version if the variation is turned on, thereby determining the resulting value as the overridden value defined in the variation; and the variation does not occur in the inheritance chain as the ancestor of the new version if the variation is turned off, thereby determining the resulting value as the value defined in the component specification.

7. The system according to claim 6, wherein a unique key value is associated with each of the overridden properties, the unique key value usable for linking the override for the value to the corresponding value of the property as defined in the component specification.

8. The system according to claim 6, wherein a unique key value identifies the variation and is associated with the new version to indicate that the new version is derived from the variation irrespective of whether the variation is turned on, the unique key value adapted to enable finding the variation, as the ancestor of the new version, in the inheritance chain when the variation is turned on.

9. A computer program product for selectively applying overrides to values defined in a version of a component, the computer program product comprising:

a non-transitory computer readable storage medium having computer readable program code embodied therein, the computer readable program code configured for:

obtaining a specification of the component, the specification defining a plurality of properties of the component and for each of the plurality of properties, a corresponding value;

defining a variation of the component as being derived from and inheriting through the component, the variation comprising, for each of a first subset of the plurality of properties of the component, an override to the corresponding value thereof;

upon a reuse of the component that creates a new version thereof, defining the new version as derived from the variation, wherein the new version comprises, for each of a second subset of the plurality of properties of the component, an override to the corresponding value thereof, wherein the corresponding value of at least one of the plurality of properties of the component is overridden in both the first subset and the second subset; and determining resulting values of the plurality of properties in the new version by selectively applying the overrides, further comprising:

for each property not in the first subset or the second subset, determining the resulting value as the value defined in the component specification;

for each property in the second subset, determining the resulting value as the overridden value defined in the new version; and for each property in the first subset but not in the second subset, recursively searching each ancestor in an inheritance chain in which the component is an ancestor of the variation and of the new version until locating a specified value for the property, wherein:

the variation occurs in the inheritance chain as an ancestor of the new version if the variation is turned on, thereby determining the resulting value as the overridden value defined in the variation; and the variation does not occur in the inheritance chain as the ancestor of the new version if the variation is turned off, thereby determining the resulting value as the value defined in the component specification.

10. The computer program product according to claim 9, wherein a unique key value is associated with each of the overridden properties, the unique key value usable for linking the override for the value to the corresponding value of the property as defined in the component specification.

11. The computer program product according to claim 9, wherein a unique key value identifies the variation and is associated with the new version to indicate that the new version is derived from the variation irrespective of whether the variation is turned on, the unique key value adapted to enable finding the variation, as the ancestor of the new version, in the inheritance chain when the variation is turned on.

12. The computer program product according to claim 9, wherein at least one of the plurality of properties is a visual property of the component.

13. The computer program product according to claim 9, wherein at least one override specified in the first subset or the second subset comprises a change to the corresponding value which is overridden.

14. The computer program product according to claim 9, wherein at least one override specified in the first subset or the second subset comprises a merging of corresponding values of new properties defined in the override with the corresponding value which is overridden.

* * * * *